(12) United States Patent
Thetford et al.

(10) Patent No.: US 8,613,799 B2
(45) Date of Patent: Dec. 24, 2013

(54) DISPERSANTS

(75) Inventors: Dean Thetford, Norden (GB); John J. Mullay, Mentor, OH (US); Christopher J. Kolp, Richmond Heights, OH (US); William R. Sweet, Richmond Heights, MI (US); Rita A. Sweet, legal representative, Richmond Heights, OH (US)

(73) Assignee: Lubrizol Limited, Hazelwood, Derby (GB)

( * ) Notice: Subject to any disclaimer, the term of this patent is extended or adjusted under 35 U.S.C. 154(b) by 724 days.

(21) Appl. No.: 12/377,745

(22) PCT Filed: Aug. 7, 2007

(86) PCT No.: PCT/US2007/075307
§ 371 (c)(1),
(2), (4) Date: May 17, 2010

(87) PCT Pub. No.: WO2008/024618
PCT Pub. Date: Feb. 28, 2008

(65) Prior Publication Data
US 2010/0263575 A1 Oct. 21, 2010

Related U.S. Application Data

(60) Provisional application No. 60/823,121, filed on Aug. 22, 2006.

(51) Int. Cl.
| | | |
|---|---|---|
| B01F 17/08 | (2006.01) | |
| B01F 17/14 | (2006.01) | |
| B01F 17/36 | (2006.01) | |
| C09D 7/02 | (2006.01) | |
| C09D 7/12 | (2006.01) | |
| C08G 63/668 | (2006.01) | |

(52) U.S. Cl.
USPC ........... 106/401; 106/400; 106/499; 106/505; 516/88; 516/90; 516/30; 524/81; 524/90; 524/413; 524/431; 524/601; 528/272; 528/287; 528/293; 528/300; 523/160

(58) Field of Classification Search
USPC ................. 516/21, 28, 30, 24, 25, 26, 88, 90; 106/400, 401, 499, 505, 447, 460; 524/81, 90, 413, 431, 601, 608; 528/272, 287, 293, 300; 523/160
See application file for complete search history.

(56) References Cited

U.S. PATENT DOCUMENTS

| | | | | |
|---|---|---|---|---|
| 2,779,783 | A * | 1/1957 | Hayes | 560/200 |
| 3,045,042 | A * | 7/1962 | Staker | 560/196 |
| 3,448,049 | A * | 6/1969 | White et al. | 508/448 |
| 4,762,568 | A * | 8/1988 | Nakamura et al. | 106/403 |
| 5,380,465 | A | 1/1995 | Baker et al. | |
| 5,981,624 | A * | 11/1999 | Thetford et al. | 523/160 |
| 6,488,760 | B1 * | 12/2002 | Binns et al. | 106/499 |
| 6,743,855 | B1 * | 6/2004 | Thetford et al. | 524/800 |
| 2003/0092833 | A1 * | 5/2003 | Frieling et al. | 524/589 |
| 2003/0153787 | A1 * | 8/2003 | Carpenter et al. | 562/592 |
| 2003/0187096 | A1 * | 10/2003 | Parris et al. | 523/160 |
| 2005/0058612 | A1 * | 3/2005 | Candau et al. | 424/59 |
| 2005/0084466 | A1 * | 4/2005 | Mullay et al. | 424/70.11 |
| 2005/0090611 | A1 * | 4/2005 | Huffer et al. | 524/800 |

FOREIGN PATENT DOCUMENTS

| | | | |
|---|---|---|---|
| WO | 87/05924 A1 | | 10/1987 |
| WO | 99/21925 A1 | | 5/1999 |
| WO | WO 99/21925 | * | 5/1999 |
| WO | WO 03/293309 A2 | * | 4/2003 |
| WO | 2004/048484 A1 | | 6/2004 |
| WO | 2005/042140 A1 | | 5/2005 |
| WO | WO 2005/113694 A1 | * | 12/2005 |
| WO | WO 2006/071460 A2 | * | 7/2006 |
| WO | WO 2006/138269 A2 | * | 12/2006 |

OTHER PUBLICATIONS

Derwent Abstract on EAST, week 201208, London: Derwent Publications Ltd., AN 2003-533557, Class A17, WO 03029309 A2 & US 20050090611 A1, (BASF AG), abstract, pp. 1-7.*

* cited by examiner

*Primary Examiner* — Daniel S Metzmaier
(74) *Attorney, Agent, or Firm* — Samuel B. Laferty

(57) ABSTRACT

The present invention relates to dispersants containing at least two lipophilic groups (e.g., alkenyl-substituted acylating agent, such as, dodecyl succinic anhydride), and the dispersants contain a hydrophilic component (e.g., alkylene glycol, polyalkylene glycol) present in an amount sufficient to at least partially disperse the amphiphilic compound in aqueous media (e.g., 30 wt % to 80 wt %). The invention further provides for dispersants as phosphate, sulphonate, and phosphite derivatives thereof. The invention further provides for the use of the dispersants in tinter compositions (e.g., universal tinter) and reduced shade paints.

16 Claims, No Drawings

DISPERSANTS

CROSS REFERENCE TO RELATED APPLICATION

This application claims priority from PCT Application Serial No. PCT/US2007/75307 filed on Aug. 7, 2007, which claims the benefit of U.S. Provisional Application No. 60/823,121 filed on Aug. 22, 2006.

FIELD OF INVENTION

The present invention relates to novel dispersants containing at least two lipophilic groups, and the dispersants contain a hydrophilic component present in an amount sufficient to at least partially disperse the amphiphilic compound in aqueous media. The invention further provides for the use of the novel dispersants in various applications.

BACKGROUND OF THE INVENTION

Numerous types of emulsifier or dispersant are known in the art and are used in many emulsion systems, such as, water-in-oil technology or oil-in-water technology, and these are disclosed in McCutcheon's Emulsifiers and Detergents, 1993, North American & International Edition and/or "Emulsions Theory and Practice," written by P. Becher and published by Oxford University Press, 2001. A number of the dispersants that are known are derived from alk(en)yl succinic anhydrides or acids. However, due to the lipophilic nature of many dispersants derived from alk(en)yl succinic anhydrides or acids, it has been difficult to devise dispersants suitable for use in aqueous media-in-oil systems due to the lipophilic nature of the alk(en)yl.

International publication WO 03/029309 A2 discloses a hydrophilic emulsifier based on polyisobutylene for use in oil-in-water applications. The emulsifier is made up of (a) a lipophilic part that is derived from a polyisobutylene with a molecular weight between 300 and 10,000; (b) a hydrophilic part containing a polyethylene oxide chain; and (c) a linker derived from polybasic carboxylic acid such as maleic anhydride.

British Patent Application GB 2 017 719 discloses a blend of two types of alk(en)yl succinic polyester. The blend contains (i) a condensation product of a $C_{8-18}$ alk(en)yl succinic anhydride with a polyalkylene glycol, and (ii) a condensation product of a $C_{40-500}$ alk(en)yl succinic anhydride with a polyalkylene glycol.

British Patent Application GB 2 117 398 discloses surfactant compositions suitable for emulsification of methanol or ethanol in hydrocarbon fluids. The surfactant composition is a blend of two surfactants of (i) 10 to 90% of a block or graft copolymer derived from the residue of a monocarboxylic acid and another polymeric residue of a water-soluble polyalkylene glycol or polyalkylenoxy polyol; and (ii) 90 to 10% of a polyester obtained by the condensation of poly(isobutenyl) succinic acid or anhydride with a water-soluble poly(alkylene glycol).

U.S. Pat. No. 4,776,966 discloses a drilling fluid composition of an invert oil-based type emulsions that contains block or graft copolymers that are produced from polycarboxylic acids and a hydrophobic component derived from a monoolefin and maleic anhydride. The maleic anhydride can be further reacted with compounds containing hydroxyl or amino groups, for example polyols or polyamines. However, the composition is only suitable for use in emulsions of brine-in-oil because it requires dissolved inorganic matter for emulsion stabilisation.

U.S. Pat. No. 7,045,580 discloses an amphiphilic compound containing: (a) a lipophilic component that is hydrocarbon group containing about 20 or more carbon atoms, (b) a hydrophilic component wherein the hydrophilic component is from (i) a monomer or an oligomer of an oxyalkylene group containing 2 or more carbon atoms; (ii) a monomer or an oligomer of an oxyalkylene group containing 3 or more carbon atoms; (iii) an oligiomer containing: (1) an oxyalkylene group containing 3 or more carbon atoms; (2) an oxyalkylene group containing 2 or more carbon atoms, provided component (2) is different from component (1); (iv) a hydrocarbyl substituted hydroxyamino group; (v) a polyhydric alcohol group; and (vi) a polyamino group; and (c) a linker covalently bonding the hydrophilic component and the lipophilic component, wherein the hydrophilic component is present in an amount sufficient to at least partially disperse the amphiphilic compound in water.

European Patent Application EP 0 156 572 A2 discloses surfactants derived from (a) a hydrophobic component and (b) a hydrophilic component covalently bonded together. The hydrophilic component further contains an anionic group selected from phosphates, phosphonates, sulphates, sulphonates and carboxymethyl. The hydrophobic component is derived from a polymer of a mono-olefin containing 2 to 6 carbon atoms typically has a molecular weight in the range 400 to 5000. The surfactants disclosed are useful in water-in-oil or oil-in-water emulsions and are incorporated into an oil phase. However, when the surfactants are used in oil-in-water emulsions, they tolerate being dispersed in water phases which are high in dissolved inorganic matter, for example, magnesium chloride or calcium chloride.

Further, in paint and coating technology, there is a further specific requirement to identify a dispersant capable of providing acceptable performance in aqueous media-in-solvent, particularly for universal tinter systems. Universal tinter systems are formulated in such a way that they are compatible and miscible with both water based paints and white spirit/aliphatic based paints. Conventional universal tinter systems may typically employ alkyl phenyl ethoxylates and glycols (a known volatile organic compound (VOC)). Due to environmental pressures, it would be desirable to formulate universal tinter systems with minimal to no alkyl phenyl ethoxylates and glycols. A particularly environmentally acceptable system would be waterbased (typically aqueous media-in-oil systems). Unfortunately, due to limited performance of known dispersants, universal tinter systems have not been optimised.

There is a need for a dispersant capable of providing acceptable performance in aqueous media-in-solvent (typically aqueous-in-oil). In particular, the dispersant may be suitable for universal tinter systems. The present invention provides a dispersant capable of providing suitable performance in aqueous-in-oil, including paint and coating technology.

SUMMARY OF THE INVENTION

In one embodiment, the invention provides a dispersant comprising an amphiphilic compound represented by formulae (Ia) or (Ib):

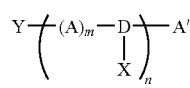

Formula (Ia)

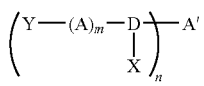

Formula (Ib)

wherein

Y is at least one of H, alkyl, aryl, an ether group, or an ester group;

D is a carboxyl containing group;

m is 3 to 1000, or 4 to 100, or 4 to 30;

n is 2 to 10, or 2 to 4, or 2;

a lipophilic component X, wherein each X group may be the same or different alk(en)yl groups containing 8 or more carbon atoms;

a hydrophilic component A and A', wherein

A is a bridging group, such as a residue of (a) a polyol group, (b) an amino alcohol group, or (c) a polyether chain of (i) a polyol or (ii) an amino alcohol; and A' is derived from at least one of a polyamino group, a polyetheramino group, a polyol group, a polyether chain of a polyol, or a polyether group, wherein the hydrophilic component is present in an amount sufficient to at least partially disperse the amphiphilic compound in aqueous media.

In one embodiment, the invention provides a dispersant comprising an amphiphilic compound represented by formulae (Ia) or (Ib):

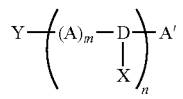

Formula (Ia)

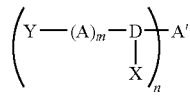

Formula (Ib)

wherein

Y is at least one of H, alkyl, aryl, an ether group, or an ester group;

D is a carboxyl containing group;

m is 3 to 1000, or 4 to 100, or 4 to 30;

n is 2 to 10, or 2 to 4, or 2;

a lipophilic component X, wherein each X group may be the same or different alk(en)yl groups containing 8 or more carbon atoms;

a hydrophilic component A and A', wherein

A is a bridging group, such as such as a residue of (a) a polyol group, (b) an amino alcohol group, or (c) a polyether chain of (i) a polyol or (ii) an amino alcohol; and A' is derived from at least one of a polyamino group, a polyetheramino group, a polyol group, a polyether chain of a polyol, or a polyether group, wherein the total amount of A+A' in the amphiphilic compound is at least 10 wt. %, or at least 15 wt. %, or at least 20 wt. %, or at least 25 wt. %, or 30 wt. % to 80 wt. % of the amphiphilic compound.

In one embodiment, the hydrophilic component of the dispersant comprising an amphiphilic compound represented by formulae (Ia) or (Ib) as defined above may be present in an amount sufficient to at least partially solubilise the amphiphilic compound in aqueous media. Typically, the hydrophilic component may at least partially solubilise the amphiphilic compound in aqueous media, when the total amounts of A+A' may be at least 20 wt. %, or at least 25 wt. %, or 30 wt. % to 80 wt. % of the amphiphilic compound.

In one embodiment, the invention further provides a tinter composition comprising (i) a particulate solid; a polar medium; and a dispersant comprising an amphiphilic compound represented by formulae (Ia) or (Ib) as defined above.

In one embodiment, the invention further provides a reduced shade paint composition comprising:

(a) a base paint comprising (i) a base pigment, (ii) a film-forming resin, and either (iii) a non-aqueous medium, or (iv) an aqueous medium; and (b) a tinter composition described above, typically present at a ratio of (a) to (b) in the range of 5:1 to 50:1, or 10:1 to 50:1 based on the total weight of the reduced shade paint.

DETAILED DESCRIPTION OF THE INVENTION

The present invention provides a dispersant and compositions as disclosed herein above.

As used herein the term "alk(en)yl" means alkyl or alkenyl.

The amphiphilic compound may be described as being miscible with aqueous media, e.g., polar solvents, or soluble in aqueous media. The aqueous media include water, alcohols (typically alkanols), or polyols such as various glycols.

D typically includes a group capable of providing two or more carboxyl containing groups. In one embodiment, the D is a group capable of providing two carboxyl containing groups.

D may be derived from malonic, succinic anhydrides, acids, or mixtures thereof. In one embodiment, D may be derived from a succinic acid or an anhydride thereof.

The dispersant comprising the amphiphilic compound of formulae (Ia) or (Ib) may be in the form of a mixture.

The lipophilic component X may contain at least 8 or at least 10 carbon atoms. The upper limit on the number of carbon atoms for X may be 300, 400 or 500.

In one embodiment, the amphiphilic compound comprises two or more different X groups.

In one embodiment, the amphiphilic compound contains two different X groups, one X group is a $C_{8-38}$ or $C_{10-28}$, or $C_{10-20}$ alk(en)yl group; and the second X group is a $C_{40-500}$ alk(en)yl group.

The $C_{40-500}$ alk(en)yl group typically includes polyisobutenyl groups. The polyisobutenyl groups may have a number average molecular weight of 450 or 550 to 5000, or 750 to 3000, or 900 to 2500. In different embodiments the polyisobutenyl groups' number average molecular weight may be 950-1000, or 2200-2300.

In one embodiment, the amphiphilic compound contains two or more different X groups, wherein the X groups have between 10 and 28 carbon atoms e.g., a mixture of $C_{16}$ and $C_{18}$, or a mixture of $C_{12}$, $C_{16}$ and $C_{18}$ alk(en)yl groups.

In one embodiment, the amphiphilic compound comprises two or more X groups that are all chemically the same.

Typically, the D-X group of formulae (Ia) or (Ib) may be derived from an alkenyl-substituted acylating agent, e.g., dodecyl succinic anhydride, hexadecyl succinic anhydride, octadecyl succinic anhydride, dodecenyl succinic anhydride, hexadecenyl succinic anhydride, octadecenyl succinic anhydride, or polyisobutylene succinic anhydride.

In one embodiment, A' comprises a residue from at least one of a polyol group, or a polyether group.

In one embodiment, A is a bridging group, comprising at least one residue of (a) a polyol group, (b) an amino alcohol group, (c) a polyether chain of a polyol or (d) a polyether chain of an amino alcohol.

In one embodiment, A comprises a bridging group, comprising at least one such as a residue of (a) a polyol group, or (b) a polyether chain of a polyol.

The polyol group of A and/or A' may be derived from compounds that include diols, triols, tetraols higher alcohols, or mixtures thereof. In one embodiment, the polyol group may be derived from a diol or a triol. In one embodiment, the polyol group may be derived from a diol.

Examples of a suitable polyol capable of forming a polyol group include ethylene glycol, propylene glycol, butylene glycol, pentaerythritol, mannitol, sorbitol, glycerol, di-glycerol, tri-glycerol, tetra-glycerol, erythritol, 2-hydroxymethyl-2-methyl-1,3-propanediol (trimethylolethane), 2-ethyl-2-(hydroxymethyl)-1,3-propanediol (trimethylolpropane), 1,2,4-hexanetriol or mixtures thereof.

In one embodiment, the polyol group may be derived from a polyalkylene glycol. Examples of a suitable polyalkylene glycol include at least one of polyethylene glycol, or a copolymer of ethylene glycol and propylene glycol, with the proviso that the amphiphilic molecule has the hydrophilic component present in an amount sufficient to at least partially disperse the amphiphilic compound in aqueous media.

The polyether chain of a polyol typically includes a polyether chain of one of the polyols described above. The polyether chain may include ethoxylated (or polyoxyethylene), propoxylated (or polyoxypropylene), butoxylated (or polyoxybutylene) polyethers, or mixtures thereof. In one embodiment, the polyether comprises an ethoxylated group. In one embodiment, the polyether chain may be a mixture of ethoxylated (or polyoxyethylene) groups and propoxylated (or polyoxypropylene) or butoxylated (or polyoxybutylene) groups, with the proviso that the amphiphilic molecule has the hydrophilic component present in an amount sufficient to at least partially disperse the amphiphilic compound in aqueous media.

The polyether chain of both A and A' may be pre-formed or formed in-situ during the preparation of the amphiphilic compound. When formed in-situ, the polyether may be derived from ethylene oxide, propylene oxide, butylene oxide or mixtures thereof.

From Formulae (Ia) and (Ib), Y is at least one of H, alkyl, aryl, an ether group, or an ester group. The number of carbon atoms present on the alkyl, aryl, an ether group, or an ester may include 1 to 40, 1 to 20, or 1 to 10. In one embodiment, Y is hydrogen.

In one embodiment, the amphiphilic compound may be further functionalised with an additional polar group. The polar group includes a phosphate, a phosphonate or phosphite), a borate, a silicate, a monoglyceride, a diglyceride, a phosphate ester, a propoxylated acid, a sorbitan, a sucrose ester, a carboxylate salt, a halide, an oxygenated halide, a nitrate, a nitrite, a nitroso compound, a nitramine, a nitro compound, a sulphonate, a sulphide, a sulphite, a thiol, an oxygenated sulphur, an azide or mixtures thereof. In one embodiment, the additional polar group may be a phosphate, a sulphonate, a phosphite, or mixtures thereof.

The phosphate polar group may be from the reaction of the amphiphilic compound and a phosphating agent. Examples of a phosphating agent include $POCl_3$, $P_2O_5$ or polyphosphoric acid.

In one embodiment, the amphiphilic compound may be obtained/obtainable/prepared from a reaction product comprising: (i) at least one of a $C_{6-38}$, or $C_{8-28}$, or $C_{10-20}$ alk(en)yl-substituted acylating agent; (ii) at least one of a $C_{40-500}$ alk(en)yl-substituted acylating agent; and (iii) at least one of a polyol, a polyether, a polyether of a polyol, polyamine, or a polyetheramine. In one embodiment, (iii) may be at least one of a polyol, a polyether, a polyether of a polyol.

In one embodiment, the amphiphilic compound may be obtained/obtainable/prepared from a reaction product comprising: (i) at least one of a $C_{6-38}$, or $C_{8-28}$, or $C_{10-20}$ alk(en)yl-substituted acylating agent; and (ii) at least one of a polyol, a polyether, a polyether of a polyol, polyamine, or a polyetheramine. In one embodiment, (ii) may be at least one of a polyol, a polyether, a polyether of a polyol.

In one embodiment, the amphiphilic compound may be obtained/obtainable/prepared from a reaction product comprising: (i) at least one of a $C_{40-500}$ alk(en)yl-substituted acylating agent; and (ii) at least one of a polyol, a polyether, a polyether of a polyol, polyamine, or a polyetheramine. In one embodiment, (ii) may be at least one of a polyol, a polyether, a polyether of a polyol.

Alternatively, the amphiphilic compound of formulae (Ia) or (Ib) may be prepared by a one-step process comprising: reacting the alk(en)yl-substituted acylating agent(s) with at least one of a polyol, a polyether, a polyether of a polyol, polyamine, or a polyetheramine. The one-step process may be carried out at a temperature of 90° C. to 200° C.

In one embodiment, the alk(en)yl-substituted acylating agent(s) comprises at least one of a $C_{6-313}$, or $C_{8-28}$, or $C_{10-20}$ alk(en)yl-substituted acylating agent.

In one embodiment, the alk(en)yl-substituted acylating agent(s) comprises at least one of a $C_{40-500}$ alk(en)yl-substituted acylating agent.

In one embodiment, the alk(en)yl-substituted acylating agent(s) comprises (i) at least one of a $C_{6-38}$, or $C_{8-28}$, or $C_{10-20}$ alk(en)yl-substituted acylating agent; and (ii) at least one of a $C_{40-500}$ alk(en)yl-substituted acylating agent.

Alternatively, the amphiphilic compound of formulae (Ia) or (Ib) may be prepared by a multi-step (typically a two-step) process comprising:

(1) reacting the alk(en)yl-substituted acylating agent(s) with a bridging or coupling amount of at least one of a polyol, a polyether, a polyether of a polyol, polyamine, or a polyetheramine to form a bridged or coupled product intermediate; and (2) reacting the product of step (1) with an additional effective amount of at least one of a polyol, a polyether, a polyether of a polyol, polyamine, or a polyetheramine; to form the amphiphilic compound of Formulae (Ia) or (Ib).

In one embodiment, the process of steps (1) and (2) may be carried out at a temperature of 50° C. to 180° C. or 90° C. to 150° C.

Optionally, the process further comprises removal of stripping solvents or carrier fluids after either or both of step (1) and step (2). Typically, removal of solvents or carrier fluids may be carried under vacuum at 50° C. to 150° C.

Optionally, the process further comprises a catalytic amount of a base catalyst. The base catalyst may include a metal hindered-alkoxide, or mixtures thereof. In one embodiment, the base catalyst may be potassium t-butoxide. If required, the base catalyst is typically added before the reaction of step (2). Typically, the base catalyst is suitable when a polyether is being prepared in-situ. Other suitable catalysts include sodium hydroxide or potassium hydroxide.

In one embodiment, a process requiring a base catalyst further includes an additional step of adding an acid, e.g., acetic acid to remove the base catalyst, followed by stripping.

In one embodiment, the amphiphilic compound may be prepared by reacting a compound of formulae (Ia) or (Ib) with a phosphating agent, at a temperature from 40° C. to 120° C., or 60° C. to 110° C., or 80° C. to less than 100° C.

In one embodiment, the amphiphilic compound may be prepared by reacting a compound of formulae (Ia) or (Ib) with a phosphating agent and then an amine or ammonia. Typically, the amine or ammonia is believed to react with an acidic group. The product may be prepared at a temperature from 40° C. to 120° C., or 60° C. to 110° C., or 80° C. to less than 100° C. The amine may be in the form of an amide or an amine salt. Suitable amines include n-butylamine, diethanolamine, triethanolamine, diethylethanolamine, dimethylethanolamine or dimethylaminopropylamine.

The mole ratio of the compound of formulae (Ia) or (Ib) to each phosphorus atom of the phosphating agent may be 3:1 to 1:1, or 2:1 to 1:1, or 1.5:1 to 1:1. When amphiphilic compound is reacted with a phosphating agent to form a mixture of mono- and di-phosphate esters, the mole ratio may be 1.5:1 to 1:1.

When the phosphating agent is $POCl_3$, it is typical to carry out the reaction with the amphiphilic compound of formulae (Ia) or (Ib) in the presence of an organic base, for example, a tertiary amine such as triethylamine, pyridine, 2,6-lutidine or 1,8-diaza-bicyclo-(5.4.0) undec-7-ene. Optionally, the reaction may be carried out in an inert atmosphere (such as nitrogen or argon) and/or in an inert solvent.

Examples of suitable inert solvents are aliphatic hydrocarbons such as octane, petroleum ethers, ligroin, mineral spirits and kerosene; aromatic hydrocarbons such as benzene, toluene and xylene; halogenated aliphatic hydrocarbons such as trichloroethane, tetrachloroethane and aromatic chlorinated hydrocarbons such as di- and tri-chlorobenzene. It is preferred, however, that the reaction between the compound of formula I and the phosphating agent is carried out in the absence of an inert solvent.

INDUSTRIAL APPLICATION

The amphiphilic compound of the invention may be suitable for use in numerous technological areas. The amphiphilic compound may be employed in water-in-oil or oil-in-water emulsions, in either the water or oil phase. In one embodiment, the amphiphilic compound may be into a water phase of the emulsion.

Examples of suitable technological areas include hydraulic fluids, metal working fluids, cleaning fluids, detergents or personal care products, agriculture such as the emulsification of herbicides or pesticides, a dispersion of solids such as pigments or slurries for incorporation into aqueous and/or non-aqueous based paints, e.g., for use in decorative and industrial coating applications, coatings, asphalt, transport applications such as in the transport of heavy or crude oil as oil-in-water emulsions, cement, organophilic coatings for clay, general lattices, inks, foam control, pharmaceuticals, foods, leather treatment, textiles, explosives, polishes or emulsion polymerisation.

The amphiphilic compound of the invention may be present in the industrial applications described above in combination with conventional surfactants, and other ingredients, e.g., resins (where these do not already constitute the organic medium), binders, fluidising agents, anti-sedimentation agents, plasticisers, anti-foamers, rheology modifiers, levelling agents, gloss modifiers, humectants, preservatives or conventional lubricant additives.

In one embodiment, the dispersant described above is suitable for metal working fluids. In one embodiment the metal working fluid is aqueous based (typically water). The dispersant described above may be present in a metal working fluid at 0.1 to 20 wt. %, or 0.5 to 10 wt. % of the metal working fluid. Optionally, the metal working fluid may further comprise at least one other performance additive such as other emulsifiers, corrosion inhibitors, lubricity enhancers, extreme pressure agents (typically containing sulphur or phosphorus), pH adjusters, antifoam agents, or biocides. The other performance additives are well known to a person skilled in the art of metal working fluids.

In one embodiment, the dispersant described above is suitable for tinter and/or base paint compositions.

In one embodiment, the dispersant described above is suitable as a wetting agent for inorganic pigments in water as well as other solvents. Typically, the dispersant is capable of reducing or preventing pigments from settling out.

In one embodiment, the dispersant is suitable for wetting of extenders in base paints making it possible to obtain acceptable viscosity and/or higher filling factor in both water and other solvent systems.

Tinter and Base Paint Compositions

In one embodiment, the invention provides a tinter composition comprising (i) a particulate solid; a polar medium; and a dispersant comprising an amphiphilic compound represented by formulae (Ia) or (Ib) as defined above; and optionally a conventional surfactant (or mixtures thereof).

The dispersant comprising an amphiphilic compound represented by formulae (Ia) or (Ib) may be present in the tinter composition at 0.1 to 30 wt. %, or 1 to 20 wt. % of the tinter composition.

Examples of a suitable conventional surfactant include alkanol ethoxylates, fatty acid ethoxylates, fatty alcohol ethoxylates, alkyl phenol ethoxylates, amine ethoxylates, or phosphate ester of the above conventional surfactants, polyacrylics (Dispex®A40 commercially available from Ciba Specialty Chemicals), or gemini-type surfactants including Surfynol®400 range available from Air Product.

The conventional surfactant may be present in the tinter composition at 0 wt. % to 30 wt. %, or 0 wt. % or 0.1 wt. % to 20 wt. % of the tinter composition.

The tinter composition may contain a pigment present in an amount including 10 to 75 wt. % of the tinter composition, depending on the strength of tinter required. Where a tinter is deliberately required to have a low strength (e.g., for slightly off-white shades), there may be an insufficient number of pigment particles to enable the dispersant to generate sufficient structure. In such circumstances, it is known to add additional neutral solid particles to the tinter and the neutral solid particles are often referred to as "extender" particles. For the purposes of the present invention, any necessary extender particles are considered to be pigment particles. Typical extenders include clays, chalks, talcs, barites and silicas.

In one embodiment, the tinter composition contains a high level of organic pigment, and optionally an inorganic pigment or filler such as talc or kaolin. The high level of organic pigment may be present at 10 to 50 wt. %; and the level of inorganic pigment or filler may be present at 0 to 20 wt. %.

In one embodiment, the tinter composition contains a high level of filler and a low level of organic pigment. The low level of organic pigment may be present at 2 to 20, or 5 to 10 wt. %; and the high level of filler be present at 10 to 40, or 20 to 40 wt. %.

In one embodiment, the tinter composition contains a high level of inorganic pigment, and optionally a low level of filler. The inorganic pigment may typically be present at 20 to 70 wt. %; and the filler may be present at 0 to 10 wt. %.

Typically, the polar medium comprises water only, but optionally further contains polyglycols, glycols, glycol ethers, glycol esters, or alcohols (typically alkanols).

In one embodiment, the polar medium comprises at least one of polyglycols, glycols, glycol ethers, glycol esters or mixtures thereof, optionally further in the presence of small amounts of water. In one embodiment, the polar medium comprises (i) at least one of glycols, glycol ethers, glycol esters or mixtures thereof, and (ii) in the absence of water.

Examples of polyglycols, glycols, glycol ethers and glycol esters include polyethylene glycol typically with a number average molecular weight of 600 or less, ethylene glycol, propylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol, di-acetone alcohol or isobutanol.

The particulate solid present in the composition may be any inorganic or organic solid material which is substantially insoluble in the polar medium. In one embodiment, the particulate solid may be a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials, and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

In one embodiment, the invention provides a reduced shade paint composition comprising: (a) a base paint comprising (i) a base pigment, (ii) a film-forming resin, and either (iii) a non-aqueous medium, or (iv) an aqueous medium; and (b) a tinter composition described above. Typically, the tinter composition may be present in a ratio of (a) to (b) in the range of 5:1 to 50:1, or 10:1 to 50:1 based on the total weight of the reduced shade paint.

The non-aqueous medium may be a non-polar organic liquid such as an aromatic or aliphatic distillate. In different embodiments, the non-aqueous medium may be an aliphatic distillate or white spirits.

The base paint may contain a base pigment which may be any organic or inorganic pigment as described above. Typically, the base pigment may be a ferric oxide or a white pigment such as titanium dioxide or calcium carbonate.

The film-forming resins used in the preparation of the reduced shade paint include both natural and synthetic resins. Examples of suitable resins include alkyd resins, alkyd/melamine formaldehyde resins, air-drying alkyd resins, or resins obtainable/obtained by (co)polymerising ethylenically unsaturated monomers (e.g., styrene-butadiene resins, long oil alkyd resins, styrenated acrylics, urethane long oil resins, epoxy resins, polyesters, chlorinated-rubber, or amino-resins).

EXAMPLES

Preparative Example 1 (PREP1)

519.4 g of polyisobutylene succinic anhydride (polyisobutylene has a number average molecular weight of 950), 159.4 g of hexadecenyl succinic anhydride and 62.07 g of ethylene glycol are heated in a vessel at a temperature ranging between 90° C. and 120° C. for 6 hours. The resultant product is diluted in 300 g of aromatic solvent and 9.8 g of potassium t-butoxide is added. The vessel contents are heated to about 100° C. and held for 30 minutes. Then, the contents of the vessel are then vacuumed stripped at 100° C. The resultant material is then reacted with 1057 g of ethylene oxide in an autoclave at 150° C. for 12 hours at a pressure of 50 to 65 psi (equivalent to (344.7 kPa to 448.2 kPa). The resultant product is then reacted in a vessel at 80° C. with sufficient acetic acid to neutralise the potassium t-butoxide. Then, the vessel is vacuum stripped at 150° C. to remove solvent. 1691 g of product are obtained.

Preparative Example 2 (PREP2)

160.2 g of polyisobutylene succinic anhydride (polyisobutylene has a number average molecular weight of 950), 123 g of hexadecenyl succinic anhydride, 16.6 g of ethylene glycol and 210 g of polyethyleneglycol MW400 are heated in a vessel at a temperature ranging between 140° C. and 160° C. for 1 hour under a nitrogen atmosphere. 1.5 g of ortho-phosphoric acid is added to the resultant product and the vessel contents are stirred at 185° C. for 16 hours. 500 g of resultant product is obtained as a brown liquid and acid value of 13 mg KOH/g.

Preparative Example 3-5 (PREP3-5)

are prepared in a similar manner to Preparative Example 1, except raw materials and amounts are varied, these are shown in Table 1.

Preparative Example 6-10 (PREP6-10)

are prepared in a similar manner to Preparative Example 2, except raw materials and amounts are varied, these are shown in Table 1.

Preparative Example 11 (PREP 11)

50 g of PREP3 is stirred at 95° C. under a nitrogen atmosphere and then 5.7 g of polyphosphoric acid is added. The mixture is stirred at 95° C. for 6 hours to give upon cooling a brown liquid (55 g).

Preparative Example 12 (PREP 12)

50 g of PREP3 is stirred at 95° C. under a nitrogen atmosphere and then 7.6 g of polyphosphoric acid was added. The mixture is stirred at 95° C. for 6 hours to give upon cooling a brown liquid (57 g).

TABLE 1

| | Preparative Examples | | | | | | | |
|---|---|---|---|---|---|---|---|---|
| | 3 | 4 | 5 | 6 | 7 | 8 | 9 | 10 |
| PIBSA (Mn) | | | 1000 | 1000 | | | 1000 | |
| PIBSA (g) | | | 68.3 | 160.2 | | | 150 | |
| Anhydride Type | HDSA | DDSA | HDSA | HDSA | HDSA | HDSA | HDSA | HDSA |
| Anhydride (g) | 162.5 | 134.2 | 55.1 | 123.0 | 162.5 | 174.6 | 121.1 | 200.0 |
| ETC (g) | 15.6 | 15.6 | 7.4 | 16.6 | | 16.6 | 11.6 | 19.2 |
| EO (g) | 200 | 200 | 200 | | | | | |
| PEG (Mn) | | | | 600 | 300 | 600 | 300 | 300 |
| PEG (g) | | | | 105 | 227 | 105 | 236.2 | 278.6 |
| PEG (Mn) | | | | 200 | | 200 | | |
| PEG (g) | | | | 105 | | 105 | | |

Footnote:
PIBSA is polyisobutylene succinic anhydride;
Anhydride type relates to either hexadecenyl succinic anhydride (HDSA), or dodecenyl succinic anhydride (DDSA);
ETG is ethylene glycol;
EO is ethylene oxide; and
PEG is polyethylene glycol.

Reference Examples 1 (RF1) and 2 (RF2) are commercially available (from Uniquema) nonyl phenol ethoxylate dispersants containing 4 and 12 ethoxylate groups, respectfully.

Reference Example 3 (RF3) is a mixture of RF1 and RF2 (both available from Uniquema). The mixture contains a 1:1 ratio of RF1 and RF2.

Reference Examples 4 (RF4) and 5 (RF5) are commercially available (from Uniquema) $C_{13}$-$C_{15}$ alcohol ethoxylate dispersants containing 7 and 11 ethoxylate groups, respectfully.

Reference Example 6 (RF6) is a mixture of RF4 and RF5 (both available from Uniquema). The mixture contains a 1:1 ratio of RF4 and RF5.

Paint Compositions

In a 4 dram trident glass vial, 1 part of a dispersant is added to 2 parts of water and mixed thoroughly. Then, 2 parts of a white alkyd based paint (containing titanium dioxide (30 wt %) with a long-oil alkyd resin in a de-aromatised white spirit) is added and the components are mixed thoroughly with a spatula. Mixtures of the dispersant in the white alkyd paint are left to stand for about 90 minutes and for 16 hours at room temperature. The mixtures are visually assessed for any separation and/or lumps present. The viscosity of each mixture is also measured on a Bohlin® V88 Viscometer equipped with a cone and plate with 2° angle and diameter of 15 mm. The cone is rotating at a rate of 38 reciprocal seconds. The results obtained are graded from A to E.

Grade A indicates no separation of the layers after 16 hours; Grade B indicates slight separation of aqueous layer after 16 hours; Grade C indicates slight separation of aqueous layer and presence of lumps after 16 hours; Grade D indicates slight separation of aqueous layer after 90 minutes; and E indicates fully separated layers after 90 minutes. The results obtained are for paint compositions 1 (P1) to 17 (P17):

TABLE 2

| Paint Composition | Dispersant | Grade | Comment | Viscosity (Pa) |
|---|---|---|---|---|
| P1 | PREP1 | A | LVHB | 0.5 |
| P2 | RF1 | A | Viscous | 3.6 |
| P3 | RF2 | C | Viscous and Lumpy | Too viscous to measure |
| P4 | RF3 | A | LVHB | 1.72 |
| P5 | RF4 | A | Very viscous | 23.4 |
| P6 | RF5 | A | Very viscous and lumpy | 27.4 |
| P7 | RF6 | A | Very viscous | Too viscous to measure |
| P8 | | E | — | — |
| P9 | PREP2 | A | LVHB | |
| P10 | PREP3 | A | LVHB | |
| P11 | PREP4 | A | LVHB | |
| P12 | PREP5 | A | LVHB | |
| P13 | PREP6 | A | LVHB | |
| P14 | PREP7 | A | LVHB | |
| P15 | PREP8 | A | LVHB | |
| P16 | PREP9 | A | LVHB | |
| P17 | PREP10 | A | LVHB | |

Footnote:
P8 is a control with no dispersant added; and
LVHB means Low viscosity and homogenous blend.

The data indicates that the paint composition of the invention (P1) is an acceptable paint and has a low viscosity, is a homogeneous blend and no visible sign of separation of the layers after 16 hours. In contrast, Reference paint compositions P2-P3 and P5-P8 fail on at least one of these measurements. Reference paint composition P4 has acceptable performance; however, P1 has a lower viscosity.

Millbases with White Paints

An organic pigment millbase is prepared using Hostaperm Violet RL (ex. Clariant), a dioxazine violet pigment with colour index classification Pigment Violet 23 which was then letdown with two White Base Paints. In a 120 cm³ glass jar, the following materials are added in the order stated to make a millbase: 21.21 g water; 5.04 g of a preparative example prepared above; 3.50 g Luzenac 20M00S talc (Luzenac); 1.05 g Byk 044 antifoam (Byk-Chemie); and 4.20 g Hostaperm Violet RL (Clariant pigments).

All of the pigment is then wet out with a spatula until the paste/mixture is homogenous and then 125 g of 3 mm glass beads is added to the above millbase. The millbase is milled on a Skandex (ex. Lau) for 2 hours. The millbases are left to cool to ambient temperature.

Universal tinters are prepared from the millbases by blending the millbases with two different white base paints, each with a different solvent media. The first base paint is Brillonip (a white alkyd gloss in aliphatic solvent (ex. Richard Colourants)), and the second base paint is 60110 emulsion (water based white emulsion paint (ex. Richard Colourants)).

In a petri dish, 1.0 g of the millbase is added, followed by 9.0 g of the Brillonip white paint. Then, using a rubber tipped glass rod, the components are mixed until the paint is homogenous giving a reduced shade paint. This process was repeated for the 60110 emulsion.

The reduced shades are then applied onto black and white card (Leneta) using a No 4 K bar for the Brillonip, a No. 6 Kbar is used for the 60110 emulsion. The machine used to apply these coatings is an automatic K-coater (Sheen Instruments). Once applied, a finger rub test is carried out at a single point on the coating to test for flocculation resistance and then left to dry in an airing cabinet overnight. The resulting dry panels are then tested for colour strength and flocculation resistance. Colour strength and flocculation measurements were done using a Macbeth Coloreye Spectrophotometer. The results are presented in Table 3.

TABLE 3

| | Dispersant | | | |
| --- | --- | --- | --- | --- |
| | Alkyd | | Water based | |
| Example | Colour Strength % | Flocculation Resistance | Colour Strength % | Flocculation Resistance |
| RF3 | 100 | 3.68 | 100 | 1.19 |
| PREP1 | 113 | 1.28 | 106 | 1.31 |
| PREP2 | 113 | 0.88 | 102 | 0.76 |
| PREP3 | 112 | 0.84 | 103 | 0.63 |
| PREP4 | 107 | 3.79 | 108 | 1.17 |
| PREP6 | 112 | 0.65 | 106 | 0.6 |
| PREP7 | 110 | 0.65 | 104 | 0.78 |
| PREP8 | 111 | 0.84 | — | — |
| PREP9 | 116 | 1.19 | 111 | 0.93 |
| PREP10 | 114 | 1.56 | 106 | 0.79 |

Footnote:
measurements not measured.

An inorganic pigment millbase is prepared using Bayferrox Yellow 3920 (ex. BASF), a yellow iron oxide pigment with colour index classification Pigment Yellow 42 which was then letdown with two White Base Paints. In a 120 cm³ glass jar, the following materials are added in the order stated to make a millbase: 24.00 g water; 3.80 g of a preparative example prepared above; 2.50 g Luzenac 20M00S talc (Luzenac); 0.70 g Byk 044 antifoam (Byk-Chemie); and 19.00 g Bayferrox Yellow 3920 (ex. BASF).

All of the pigment is then wet out with a spatula until the paste/mixture is homogenous and then 125 g of 3 mm glass beads is added to the above millbase. The millbase is milled on a Skandex (ex. Lau) for 2 hours. The millbases are left to cool to ambient temperature.

In a petri dish, 0.45 g of the millbase is added, followed by 4.5 g of the Brillonip white paint. Then, using a rubber tipped glass rod, the components are mixed until the paint is homogenous giving a reduced shade paint. This process was repeated for the 60110 emulsion.

The reduced shades are then applied onto black and white card (Leneta) using a No 4 K bar for the Brillonip, a No. 6 Kbar was used for the 60110 emulsion. The machine used to apply these coatings is an automatic K-coater (Sheen Instruments). Once applied, a finger rub test is done at a single point on the coating to test for flocculation resistance and then left to dry in an airing cabinet overnight. The resulting dry panels are then tested for colour strength and flocculation resistance. Colour strength and flocculation measurements were done using a Macbeth Coloreye Spectrophotometer. The results are presented in Table 4.

TABLE 4

| | Dispersant | | | |
| --- | --- | --- | --- | --- |
| | Alkyd | | Water based | |
| Example | Colour Strength % | Change in Flocculation Resistance | Colour Strength % | Change in Flocculation Resistance |
| RF3 | 100 | 1.09 | 100 | 0.36 |
| PREP11 | 111 | 1.45 | 98 | 0.44 |
| PREP12 | 113 | 0.33 | 102 | 0.62 |

Overall, the dispersant and paint composition of the present invention have better performance than the reference paint compositions typically showing greater colour strength and greater flocculation resistance with a lower change in flocculation. In some instances, the benefits of the paint composition of the present invention are observed in at least one of the solvent or aqueous media.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A tinter composition comprising (i) a particulate solid, a polar medium, and a dispersant comprising an amphiphilic compound represented by formulae (Ia) or (Ib):

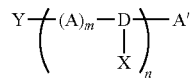
Formula (Ia)

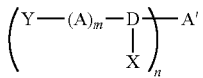
Formula (Ib)

wherein
Y is at least one of H, or an alkyl, aryl, or an ester group having 1 to 10 carbon atoms;
D is a dicarboxyl group derived from a dicarboxylic acid and/or an anhydride of a dicarboxylic group; m is 3 to 1000; n is 2 to 10;
a lipophilic component X, wherein each X group may be the same or different alk(en)yl groups containing 8 or more carbon atoms; and
a hydrophilic component A and A',
wherein
said dispersant of formulae (Ia) or (Ib) comprises at least one $C_{10\text{-}20}$ alk(en)yl group substituted acylating agent:
A is a bridging group derived from an alkylene glycol and/or polyalkylene glycol that bridges between two D repeat units in formula Ia or between a D and a Y repeat unit in formula Ia or Ib; and
A' is a residue from at least one of a polyol group, a polyether group, a polyether chain of a polyol, a polyamino group, or a polyetheramino group, said residue resulting from the reaction with the dicarboxylic acid and/or anhydride forming D-A' wherein the total amount of A+A' in the amphiphilic compound is 30 wt. % to 80 wt. % of the amphiphilic compound.

2. The tinter composition of claim 1, wherein A' is a residue from at least one of a polyol group, or a polyether group.

3. The tinter composition of claim 1, wherein said dispersant of formulae (Ia) or (Ib) is further reacted to form a phosphate.

4. The tinter composition according to claim 1, wherein m is from 4 to 30, and n is from 2 to 4.

5. The tinter composition of claim 1, wherein said dispersant of formulae (Ia) or (Ib) further comprises at least one $C_{40\text{-}500}$ alk(en)yl-substituted acylating agent.

6. The tinter composition of claim 5, wherein said dispersant of formulae (Ia) or (Ib) is further reacted to form a phosphate, sulphonate, phosphite, or mixtures thereof.

7. The tinter composition of claim 5, wherein said dispersant of formulae (Ia) or formula (Ib) is further reacted to form a phosphate.

8. The timer composition of claim 1, wherein said dispersant of formulae (Ia) or (Ib) is further reacted to form a phosphate, sulphonate, phosphite, or mixtures thereof.

9. A reduced shade paint composition comprising the tinter composition of claim 1, and further comprising: a base paint comprising (i) a base pigment, (ii) a film-forming resin, and either (iii) a non-aqueous medium, or (iv) an aqueous medium.

10. The reduced shade paint composition of claim 9, wherein the weight ratio of said base paint to said tinter composition is in the range of 5:1 to 50:1.

11. The reduced shade paint composition of claim 9, wherein said dispersant of formulae (Ia) or formula (Ib) further comprises at least one C40400 alk(en)yl-substituting acylating agent.

12. The reduced shade paint composition of claim 11, wherein said dispersant of formulae (Ia) or (Ib) is further reacted to form a phosphate, sulphonate, phosphite, or mixtures thereof.

13. The reduced shade paint composition of claim 11, wherein said dispersant of formulae (Ia) or (Ib) is further reacted to form a phosphate.

14. The reduced shade paint composition of claim 9, wherein said dispersant of formulae (Ia) or (Ib) is further reacted to form a phosphate, sulphonate, phosphite, or mixtures thereof.

15. The reduced shade paint composition of claim 9, wherein said dispersant of formulae (Ia) or (Ib) is further reacted to form a phosphate.

16. The reduced shade paint composition of claim 9, wherein compound, m is from 4 to 30, and n is from 2 to 4.

* * * * *